US010196509B2

(12) United States Patent
Felipe et al.

(10) Patent No.: US 10,196,509 B2
(45) Date of Patent: Feb. 5, 2019

(54) INHIBITING FOULING TENDENCY IN HIGH COAL ASH-CONTAINING WATER SYSTEMS

(71) Applicant: BAKER HUGHES INCORPORATED, Houston, TX (US)

(72) Inventors: Mary Jane Legaspi Felipe, Sugar Land, TX (US); Khac Truc Nguyen, Houston, TX (US); Sidney A. Dunn, Lake Charles, LA (US)

(73) Assignee: Baker Hughes, a GE company, LLC, Houston, TX (US)

(*) Notice: Subject to any disclaimer, the term of this patent is extended or adjusted under 35 U.S.C. 154(b) by 227 days.

(21) Appl. No.: 15/144,183

(22) Filed: May 2, 2016

(65) Prior Publication Data
US 2016/0326432 A1 Nov. 10, 2016

Related U.S. Application Data

(60) Provisional application No. 62/158,088, filed on May 7, 2015.

(51) Int. Cl.
C08L 23/32 (2006.01)
C02F 5/14 (2006.01)
C02F 5/12 (2006.01)
C02F 5/10 (2006.01)
C08L 35/00 (2006.01)

(52) U.S. Cl.
CPC .............. C08L 23/32 (2013.01); C02F 5/105 (2013.01); C02F 5/125 (2013.01); C02F 5/145 (2013.01); C02F 2303/22 (2013.01); C02F 2305/04 (2013.01)

(58) Field of Classification Search
CPC .......... C08L 23/32; C08L 35/00; C02F 5/105; C02F 5/125; C02F 5/145; C09D 5/1662
See application file for complete search history.

(56) References Cited

U.S. PATENT DOCUMENTS

| 3,463,730 | A | | 8/1969 | Booth et al. |
| 4,441,887 | A | | 4/1984 | Funk |
| 4,623,359 | A | | 11/1986 | Yaghmaie et al. |
| 4,973,409 | A | * | 11/1990 | Cook ........................ C02F 5/10 210/698 |
| 5,080,801 | A | | 1/1992 | Molter et al. |
| 5,182,343 | A | * | 1/1993 | Ono .................... B01F 17/0057 106/778 |
| 8,674,021 | B2 | | 3/2014 | Rodrigues et al. |

FOREIGN PATENT DOCUMENTS

| CN | 1526663 A | * | 9/2004 |
| CN | 103086524 A | | 5/2013 |
| CN | 103708632 A | | 4/2014 |
| WO | 8300501 A1 | | 2/1983 |

* cited by examiner

Primary Examiner — Pamela H Weiss
(74) Attorney, Agent, or Firm — Mossman, Kumar & Tyler, P.C.

(57) ABSTRACT

Dispersions of coal ash in water can be inhibited or prevented from scaling and simultaneously be inhibited or prevented from fouling by introducing thereto an additive blend that includes an anionic water-soluble polymer and a second polymer different from the anionic water-soluble polymer, where the second polymer is selected from the group consisting of copolymers and terpolymers having a plurality of hydrophobic groups.

17 Claims, 3 Drawing Sheets

INHIBITING FOULING TENDENCY IN HIGH COAL ASH-CONTAINING WATER SYSTEMS

CROSS-REFERENCE TO RELATED APPLICATION

This application claims the benefit of U.S. Provisional Patent Application Ser. No. 62/158,088 filed May 7, 2015, incorporated herein by reference in its entirety.

TECHNICAL FIELD

The invention relates to methods and compositions for inhibiting and/or preventing scaling by and/or inhibiting or preventing fouling by aqueous slurries or dispersions of solid carbonaceous materials, and most particularly relates, in one non-limiting embodiment, to methods and compositions for inhibiting and/or preventing scaling by and/or inhibiting or preventing fouling of coal ash water dispersions using polymer dispersants.

TECHNICAL BACKGROUND

Coal ash is the generic term referring to several distinct materials produced when coal is combusted to produce electricity. The term "coal ash" may include, but not necessarily be limited to, fly ash, bottom ash, boiler slag, and various forms of flue gas emission control or desulfurization materials. Each of these types vary by coal source and composition, the combustion technology used, the emissions control technology used, and other factors. It is better to find a use for coal ash instead of disposing of it in landfills, thereby avoiding the environmental degradation and energy costs associated with mining unused materials. For instance, for every ton of fly ash used in place of Portland cement, about a ton of carbon dioxide is prevented from entering Earth's atmosphere. A significant benefit of using fly ash is that it requires less water than Portland cement, conserving a limited resource, while also reducing a project's water and equipment costs. Boiler slag, which replaces sand in blasting grit, has the benefit of being free of silica, which eliminates the potential health risk of silicosis. Flue gas desulfurization materials are used in 30% of US wallboard products, avoiding the need to mine gypsum. Environmentally and economically it makes more sense to use existing materials than to mine new ones.

It is more convenient and economical to transport coal ash as a dispersion or slurry in water, where the coal ash dispersion may be pumped and transported through pipes. However, coal ash dispersions have two disadvantages. First, if the coal ash is not dispersed in the water medium in a stable way, it may settle out and cause fouling of the pumps, pipes, and other transportation apparatus used to move it from one place to another. Second, coal ash dispersions have a tendency to cause calcium carbonate ($CaCO_3$) scaling of the equipment it passes through, including pumps, pipes, tanks, etc. Scale deposits may also cause fouling if they are severe enough.

U.S. Pat. No. 4,441,887 discloses a stable slurry containing carbonaceous solid material (such as coal or coke), a carrier liquid (such as water or oil), and a dispersing agent. Also disclosed is a method of preparing the slurry by grinding a carbonaceous solid material at a high solids content of at least 60 volume percent to generate at least 5 weight percent of colloidal carbonaceous particles and mixing the carbonaceous solid material so ground with carrier liquid and dispersing agent until a slurry with specified properties is produced. A method of stabilizing a carbonaceous solid material-liquid slurry by adding to the slurry either fine carbonaceous solid material and/or dispersing agent and/or stabilizer is also disclosed.

U.S. Pat. No. 4,623,359 discloses aqueous slurries of solid carbonaceous fuel that include a novel highly converted sulfonated surfactant derived from a suspension of low rank coal and coal derived creosote oil for reducing the viscosity and increasing the solids content of the aqueous slurry.

It would be desirable if new methods and compositions were found which permitted the simultaneous prevention or inhibition of both fouling and scaling of coal ash dispersions.

SUMMARY

There is provided, in one non-limiting embodiment, a method of simultaneously inhibiting or preventing calcium carbonate scale deposition and inhibiting or preventing fouling by a dispersion of coal ash in water, the method comprising adding to the coal ash dispersion an amount of an additive blend effective to simultaneously inhibit scale deposition and prevent fouling, where the additive blend includes an anionic water-soluble polymer and a second polymer different from the anionic water-soluble polymer, where the second polymer is selected from the group consisting of copolymers and terpolymers having a plurality of hydrophobic groups.

In another non-restrictive version there is provided a dispersion of coal ash in water simultaneously inhibited against scale deposition and fouling, where the coal ash dispersion includes water, coal ash, and an additive blend comprising an anionic water-soluble polymer and a second polymer different from the anionic water-soluble polymer, where the second polymer is selected from the group consisting of copolymers and terpolymers having a plurality of hydrophobic groups, and where the amount of the additive blend is effective to simultaneously inhibit against or prevent scale deposition and fouling.

DETAILED DESCRIPTION

Figure 1:
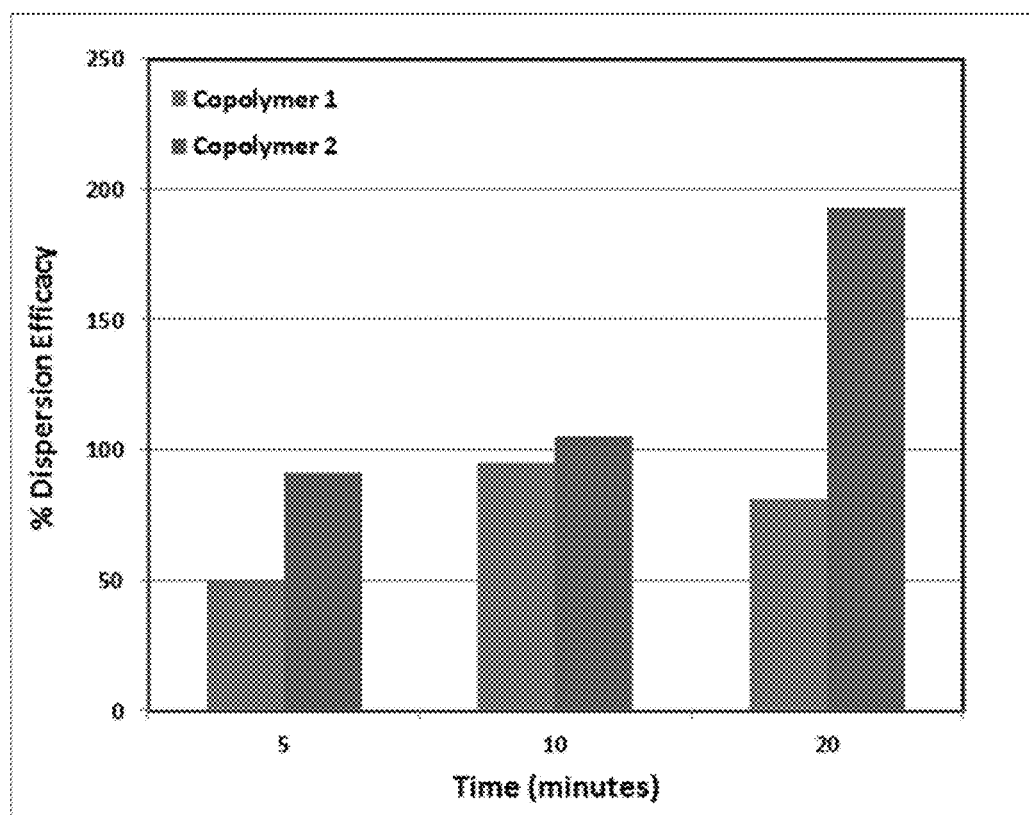
FIG. 1 is a graph demonstrating the effect of a copolymer with hydrophobic groups on the dispersion efficiency of copolymer systems.

Inhibiting scale deposition in aqueous water systems typically employs the addition of anionic water-soluble polymers. It has been discovered that for aqueous systems that contain high amounts of coal ash, it is necessary to include a polymeric agent that can efficiently stabilize and disperse the coal ash to prevent or inhibit fouling. A method of simultaneously inhibiting scale and inhibiting fouling of coal ash dispersions has been discovered which employs an additive blend that has an anionic copolymer in combination with a different copolymer or terpolymer containing some hydrophobic groups. These polymeric groups enable better wetting of the coal ash and therefore impart better dispersion—that is, the dispersion of coal ash is more stable and there little or no tendency of the coal ash to settle out and foul the system.

As defined herein, a high coal ash dispersion is defined as a dispersion of from about 500 independently to about 5000 ppm by weight coal ash in water; alternatively about 500 independently to about 2000 ppm by weight coal ash in water. When used in connection with a range, the term "independently" herein means that any lower threshold may be combined with any upper threshold to give a suitable alternative range.

The additive blend has at least two components, both of which act as dispersants to help stabilize the coal ash dispersion; that is, prevent or inhibit settling of the coal ash). A first component is an anionic water-soluble polymer. Suitable anionic water-soluble polymers include, but are not necessarily limited to, polyacrylic-based copolymers and terpolymers, polymaleic anhydride-based copolymers and terpolymers, copolymers of acrylamide-2-acrylamido-2-methylpropane sulfonic acid (AA-AMPS), copolymers of AA-AMPS and styrene sulfonate, copolymers of AA-AMPS and alkyl acrylamide, maleic anhydride olefin copolymers, water-soluble lignin sulphonates, and any alternative of olefin maleic anhydride copolymer. The weight average molecular weight of the anionic water-soluble polymer ranges from about 500 independently to about 15,000 Mw; alternatively from about 5000 independently to about 13,000 Mw. However, in the case of water-soluble lignin sulphonates the weight average molecular weight ranges from about 3000 independently to about 90,000 Mw; alternatively from about 20,000 independently to about 32,000 Mw.

A second component of the additive blend or second polymer is different from the anionic water-soluble polymer and is suitably a copolymer and/or terpolymer having a plurality of hydrophobic groups. Further, suitable second polymers include polymers and terpolymers comprising monomers selected from the group consisting of carboxylic acid, acrylic acid, maleic acid, methacrylic acid, maleic anhydride, sulfonated styrene, isobutylene, polyvinyl alcohol, phosphate-containing acrylates and maleates, phosphonate-containing acrylates and maleates, and phosphonocarboxylic acid. Specific examples of suitable second components include, but are not limited to, ACUMER™ and OPTIDOSE™ copolymers and terpolymers available from Dow Chemical Company, CARBOSPERSE™ copolymers and terpolymers available from Lubrizol Corporation, FLOSPERSE™ copolymer and terpolymer from SNF, SOKALAN® copolymers and terpolymers available from BASF, and ISOBAM™ copolymers and terpolymers available from Kuraray. In one non-limiting embodiment, the weight average molecular weight of the second polymer ranges from about 500 independently to about 15,000 Mw; alternatively from about 5000 independently to about 13,000 Mw. The hydrophobic groups are selected from the group consisting of aromatic groups and alkyl groups having at least 2 carbon atoms; in another non-limiting embodiment at least 24 carbon atoms.

In another non-limiting version, the effective amount of additive blend in the coal ash dispersion ranges from about 1 independently to about 40 ppm by weight active polymer; alternatively from about 2.5 independently to about 25 ppm by weight active polymer.

In a different non-limiting embodiment, the weight ratio of the anionic water-soluble polymer to the second polymer in the additive blend ranges from about 10:1 independently to about 3:2; alternatively, the weight ratio of the anionic water-soluble polymer to the second polymer in the additive blend ranges from about 9:1 independently to about 5:3.

In a different non-limiting embodiment, the coal ash dispersion, either before or after the additive blend is introduced into it, may have one or more, or all, of the following characteristics: a temperature of between about 75 and about 120° F. (about 24 to about 49° C.); a pH between about 8 and about 10; a hardness between about 100 to about 1000 ppm weight calcium as $CaCO_3$; and a conductivity of from about 400 to about 7000 μS/cm.

There is no particular procedure or protocol for adding the additive blend to the coal ash dispersion. The additive blend may simply be introduced or added to the coal ash dispersion in any convenient manner.

The invention will now be described with respect to certain examples which are not meant to limit the invention in any way, but simply to illustrate certain specific instances.

EXAMPLE 1

Example 1 is a comparison of the % dispersion efficacy of Copolymer 1 with that of Copolymer 2 at times of 5, 10 and 20 minutes. The Copolymers were used individually, not as part of a blend. Copolymer 1 is an anionic water-soluble polymer as defined herein. Copolymer 2 is a second polymer as defined herein different from Copolymer 1, and Copolymer 2 contains hydrophobic groups. The coal ash dispersion used for Example 1 contained about 1500 ppm by weight coal ash. The amount of the copolymers used in the coal ash dispersion for this Example 1 was 20 ppm by weight. The results are presented in FIG. 1 and it may be seen that the second Copolymer 2 containing hydrophobic groups helps in wetting the coal ash and thus disperse these types of materials better in water systems as compared with Copolymer 1 that has no hydrophobic groups.

EXAMPLE 2

Figure 2:
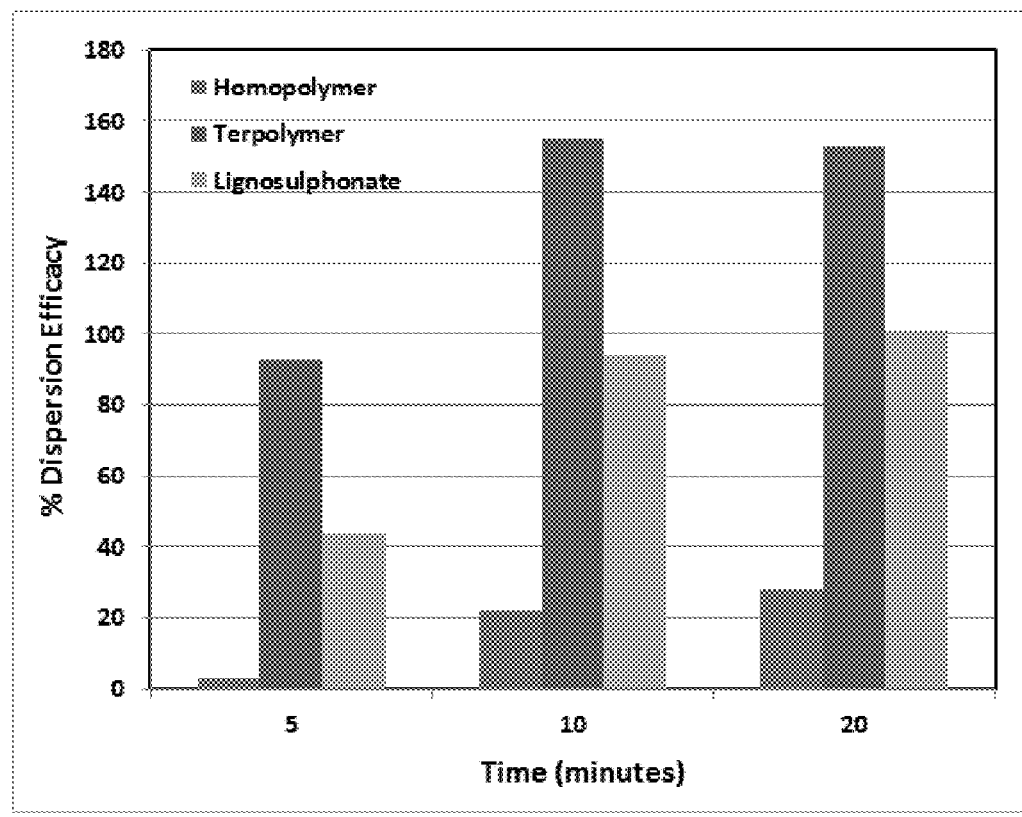
FIG. 2 is a graph presenting the effect of a terpolymer with hydrophobic groups on dispersing coal ash in water systems.

Example 2 is a comparison of the % dispersion efficacy for a Homopolymer with that of a Terpolymer and that of a Lignosulphonate at times of 5, 10 and 20 minutes. The polymers were used individually, not as part of a blend. The Homopolymer was an acrylic homopolymer. The Terpolymer was an acrylic terpolymer containing hydrophobic groups. The Lignosulphonate was a carbohydrate-based material that contained both polar and nonpolar (hydrophobic) groups. The coal ash dispersion used for Example 2 was the same as that used for Example 1. The amount of the polymers used in the coal ash dispersion for this Example 2 was 20 ppm by weight. The results are presented in FIG. 2. The Terpolymer showed more efficient dispersion when compared to the Homopolymer that had no hydrophobic groups. It may also be seen that the Terpolymer containing hydrophobic groups helps in wetting the coal ash and thus give better dispersion efficacy.

EXAMPLE 3

Example 3 is a comparison of the % dispersion efficacy of five additives:
  40 ppm maleic anhydride olefin copolymer;
  30 ppm sulfonated copolymer;
  30 ppm sulfonated copolymer/2-phosphonobutane-1,2,4-tricarboxylic acid (PBTC) blend;
  30 ppm sulfonated terpolymer/PBTC blend; and
  20 ppm sulfonated terpolymer/PBTC blend+10 ppm maleic anhydride olefin copolymer.

The maleic anhydride olefin copolymer is a first component that has hydrophobic groups, as described herein. The sulfonated copolymer does not have hydrophobic groups. The sulfonated terpolymer does have hydrophobic groups. It may be seen that the last additive blend of sulfonated terpolymer/PBTC blend+10 ppm maleic anhydride olefin copolymer gave the best dispersion efficacy of Example 3, even when less of it (20 ppm) is used as compared with greater amounts (40 ppm and 30 ppm) of the other additives. Thus the data of Example 3 demonstrate the surprising and unexpected results of the additive blends described herein to prevent fouling.

Figure 3:
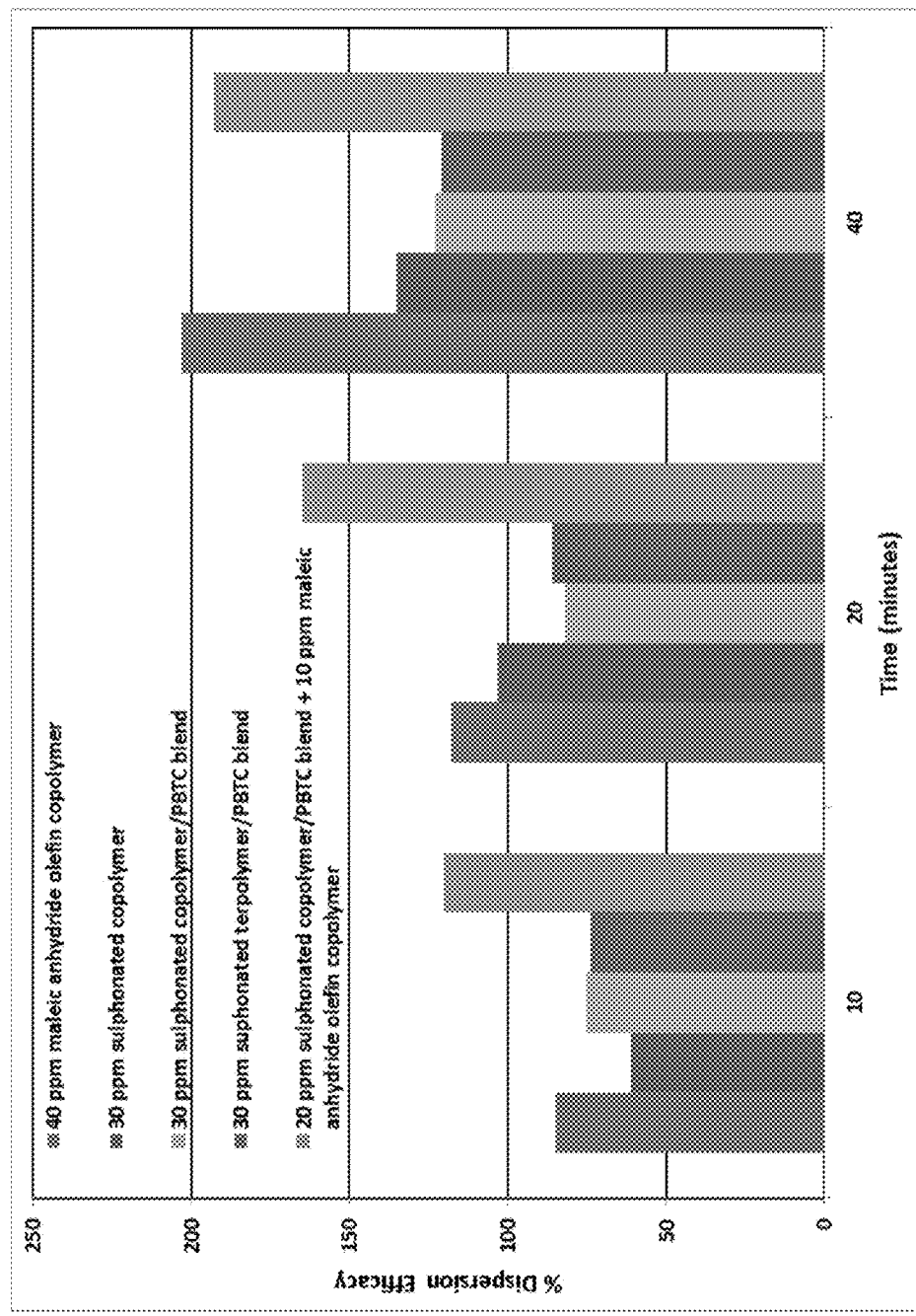
FIG. 3 is a graph comparing the effect of two different copolymers alone with blends of PBTC with a copolymer and a terpolymer, and then also with a maleic anhydride olefin copolymer present.

Thus, the concept of the methods and compositions described herein is at least partially proven by the Examples 1, 2, and 3 data discussed above and presented in FIGS. 1, 2, and 3, respectively.

Many modifications may be made in the methods of and compositions of this invention without departing from the scope thereof. For example, different polymers, copolymers, terpolymers, and different proportions of these polymers, may be used from those described or exemplified, and still be within the scope of the invention. Furthermore, the additive blends described herein are expected to be useful in coal ash dispersions other than the specific coal ash dispersion exemplified herein, and in different proportions.

The present invention may suitably comprise, consist or consist essentially of the elements disclosed and may be practiced in the absence of an element not disclosed. For instance, there may be provided a method of simultaneously inhibiting scale deposition and preventing fouling by a dispersion of coal ash in water, the method comprising, consisting essentially of, or consisting of adding to the coal ash dispersion an amount of an additive blend effective to simultaneously inhibit scale deposition and prevent fouling, where the additive blend consists essentially of or consists of an anionic water-soluble polymer and a second polymer different from the anionic water-soluble polymer, where the second polymer is selected from the group consisting of copolymers and terpolymers having a plurality of hydrophobic groups.

Further, there may be provided a coal ash dispersion that is simultaneously inhibited against scale deposition and fouling, where the coal ash dispersion consists essentially of or consists of water, coal ash, and an additive blend consisting essentially of or consisting of an anionic water-soluble polymer and a second polymer different from the anionic water-soluble polymer, where the second polymer is selected from the group consisting of copolymers and terpolymers having a plurality of hydrophobic groups.

The words "comprising" and "comprises" as used herein throughout the claims, are to be interpreted as "including but not limited to" and "includes but not limited to", respectively. As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method of simultaneously inhibiting or preventing calcium carbonate scale deposition and inhibiting or preventing fouling by a dispersion of coal ash in water, the method comprising adding to the coal ash dispersion an amount of an additive blend effective to simultaneously inhibit scale deposition and prevent fouling, where the additive blend comprises:
    an anionic water-soluble polymer selected from the group consisting of maleic olefin copolymers, water-soluble lignin sulphonates, and an olefin maleic anhydride copolymer; and
    a second polymer different from the anionic water-soluble polymer, where the second polymer is selected from the group consisting of copolymers and terpolymers having a plurality of hydrophobic groups and comprises monomers selected from the group consisting of isobutylene, polyvinyl alcohol, phosphate-containing acrylates and maleates, phosphonate-containing acrylates and maleates, and phosphonocarboxylic acid.

2. The method of claim 1 where:
    the weight average molecular weight of the anionic water-soluble polymer ranges from about 500 to about 15,000 Mw; except in the case of water-soluble lignin sulphonates the weight average molecular weight ranges from about 3000 to about 90,000 Mw; and
    the weight average molecular weight of the second polymer ranges from about 500 to about 15,000 Mw.

3. The method of claim 1 where the effective amount of additive blend in the coal ash dispersion ranges from about 2 to about 40 ppm by weight active polymer.

4. The method of claim 1 where the weight ratio of the anionic water-soluble polymer to the second polymer in the additive blend ranges from about 10:1 to about 3:2.

5. The method of claim 1 where for the second polymer, the hydrophobic groups are selected from the group consisting of aromatic groups and alkyl groups having at least two carbon atoms.

6. The method of claim 1 where the coal ash dispersion has the following characteristics:
    a pH between about 8 and about 10; and a hardness between about 100 to about 1000 ppm weight calcium as $CaCO_3$.

7. A method of simultaneously inhibiting or preventing calcium carbonate scale deposition and inhibiting or preventing fouling by a dispersion of coal ash in water, the method comprising adding to the coal ash dispersion an amount of an additive blend effective to simultaneously inhibit scale deposition and prevent fouling, where the additive blend comprises:
   an anionic water-soluble polymer selected from the group consisting of maleic olefin copolymers, water-soluble lignin sulphonates, and an olefin maleic anhydride copolymer; and
   a second polymer different from the anionic water-soluble polymer, where the second polymer is selected from the group consisting of copolymers and terpolymers having a plurality of hydrophobic groups, and where the second polymer comprises monomers selected from the group consisting of isobutylene, polyvinyl alcohol, phosphate-containing acrylates and maleates, phosphonate-containing acrylates and maleates, and phosphonocarboxylic acid,
where the amount of coal ash in the water ranges from about 500 to about 5000 ppm by weight.

8. The method of claim 7 where:
   the weight average molecular weight of the anionic water-soluble polymer ranges from about 500 to about 15,000 Mw; except in the case of water-soluble lignin sulphonates the weight average molecular weight ranges from about 3000 to about 90,000 Mw; and
   the weight average molecular weight of the second polymer ranges from about 500 to about 15,000 Mw.

9. The method of claim 8 where the effective amount of additive blend in the coal ash dispersion ranges from about 2 to about 40 ppm by weight active polymer.

10. The method of claim 7 where the coal ash dispersion has the following characteristics:
    a pH between about 8 and about 10; and
    a hardness between about 100 to about 1000 ppm weight calcium as $CaCO_3$.

11. A dispersion of coal ash in water simultaneously inhibited against scale deposition and fouling, where the coal ash dispersion comprises:
    water;
    coal ash; and
    an additive blend comprising:
      an anionic water-soluble polymer selected from the group consisting of maleic olefin copolymers, water-soluble lignin sulphonates, and an olefin maleic anhydride copolymer; and
      a second polymer different from the anionic water-soluble polymer, where the second polymer is selected from the group consisting of copolymers and terpolymers having a plurality of hydrophobic groups and comprises monomers selected from the group consisting of isobutylene, polyvinyl alcohol, phosphate-containing acrylates and maleates, phosphonate-containing acrylates and maleates, and phosphonocarboxylic acid,
where the amount of the additive blend is effective to simultaneously inhibit or prevent against scale deposition and fouling.

12. The coal ash dispersion of claim 11 where the amount of coal ash in the water ranges from about 500 to about 5000 ppm.

13. The coal ash dispersion of claim 11 where:
    the weight average molecular weight of the anionic water-soluble polymer ranges from about 500 to about 15,000 Mw; except in the case of water-soluble lignin sulphonates the weight average molecular weight ranges from about 3000 to about 90,000 Mw; and
    the weight average molecular weight of the second polymer ranges from about 500 to about 15,000 Mw.

14. The coal ash dispersion of claim 11 where the effective amount of additive blend in the coal ash dispersion ranges from about 2 to about 40 ppm by weight active polymer.

15. The coal ash dispersion of claim 11 where the weight ratio of the anionic water-soluble polymer to the second polymer in the additive blend ranges from about 10:1 to about 3:2.

16. The coal ash dispersion of claim 11 where for the second polymer, the hydrophobic groups are selected from the group consisting of aromatic groups and alkyl groups having at least six carbon atoms.

17. The coal ash dispersion of claim 11, where the coal ash dispersion has the following characteristics:
    a pH between about 8 and about 10; and
    a hardness between about 100 to about 1000 ppm weight calcium as $CaCO_3$.

* * * * *